(12) United States Patent
Schmidt et al.

(10) Patent No.: US 7,168,751 B2
(45) Date of Patent: Jan. 30, 2007

(54) AUTOMOTIVE CENTER STACK PANEL WITH CONTACT-LESS SWITCHING

(75) Inventors: Robert Mark Schmidt, Livonia, MI (US); Paul R. McEvilly, Farmington Hills, MI (US); Anthony C. Walowich, Allen Park, MI (US)

(73) Assignee: Lear Corporation, Southfield, MI (US)

( * ) Notice: Subject to any disclaimer, the term of this patent is extended or adjusted under 35 U.S.C. 154(b) by 37 days.

(21) Appl. No.: 10/711,466

(22) Filed: Sep. 20, 2004

(65) Prior Publication Data
US 2006/0061125 A1 Mar. 23, 2006

(51) Int. Cl.
*B62D 25/14* (2006.01)
(52) U.S. Cl. ........................................ 296/70
(58) Field of Classification Search ............. 296/70, 296/24.3, 24.34, 191, 37.8, 37.12, 1.07, 1.08; 439/34, 502, 503; 307/9.1, 10.1
See application file for complete search history.

(56) References Cited

U.S. PATENT DOCUMENTS

| | | | |
|---|---|---|---|
| 5,324,203 A | | 6/1994 | Sano et al. |
| 5,712,764 A | | 1/1998 | Baker et al. |
| 5,715,140 A | | 2/1998 | Sinkunas et al. |
| 5,819,227 A | * | 10/1998 | Obuchi ........................... 705/1 |
| 5,873,749 A | * | 2/1999 | Takiguchi et al. .......... 439/534 |
| 6,048,020 A | | 4/2000 | Gronowicz et al. |
| 6,095,272 A | | 8/2000 | Takiguchi et al. |
| 6,250,706 B1 | | 6/2001 | Davis, Jr. et al. |
| 6,295,883 B1 | * | 10/2001 | Tsukada et al. ............. 74/89.18 |
| 6,355,895 B1 | * | 3/2002 | Crowley et al. ............. 200/512 |
| 6,360,149 B1 | * | 3/2002 | Kwon et al. .................. 701/41 |
| 6,388,881 B2 | | 5/2002 | Yamauchi et al. |
| 6,505,876 B1 | | 1/2003 | Watanabe et al. |
| 6,621,688 B1 | | 9/2003 | Burdick |
| 6,721,651 B1 | * | 4/2004 | Minelli ....................... 701/200 |
| 6,751,552 B1 | * | 6/2004 | Minelli ....................... 701/213 |
| 6,752,444 B2 | * | 6/2004 | Kitano et al. ............. 296/184.1 |
| 6,972,751 B2 | * | 12/2005 | Sadahiro .................... 345/173 |
| 7,021,691 B1 | * | 4/2006 | Schmidt et al. ............... 296/70 |
| 2003/0048260 A1 | * | 3/2003 | Matusis ...................... 345/173 |
| 2003/0222858 A1 | * | 12/2003 | Kobayashi ................. 345/173 |
| 2005/0184973 A1 | * | 8/2005 | Lum et al. .................. 345/173 |
| 2006/0017326 A1 | * | 1/2006 | Hein et al. ................. 307/10.1 |
| 2006/0028453 A1 | * | 2/2006 | Kawabe ...................... 345/173 |
| 2006/0047426 A1 | * | 3/2006 | Vitito ......................... 701/213 |

\* cited by examiner

*Primary Examiner*—H. Gutman
(74) *Attorney, Agent, or Firm*—Earl LaFontaine, Esq.; Artz & Artz, P.C.

(57) ABSTRACT

An automotive center stack panel assembly is provided comprising an instrument panel face plate having an outer face plate surface and an internal face plate surface. A display window region is formed into the instrument panel face plate and has a curved internal window surface. A flat flex circuit assembly is in direct contact with the curved internal window surface. The flat flex circuit assembly includes a plurality of field effect sensors. A clamp plate backer is mounted to the internal face plate surface. A soft durometer backer is positioned between the clamp plate backer and the flat flex circuit assembly. The clamp plate backer compresses the soft durometer backer such that the soft durometer backer presses the field effect sensors into direct contact with the curved internal window surface without adhesives.

18 Claims, 2 Drawing Sheets

AUTOMOTIVE CENTER STACK PANEL WITH CONTACT-LESS SWITCHING

TECHNICAL FIELD

The present invention relates generally to an automotive center stack panel with contact-less switching and more particularly to an automotive center stack panel with field-effect sensors assembled without adhesive.

BACKGROUND OF THE INVENTION

Automotive dash and control panels have been designed to incorporate an ever increasing array of controls and features. These features must not only provide a wide range of services, they must do so reliably from within the automotive interior, an environment prone to stressors such as heat, cold, moisture, and vibration. These environmental conditions dictate robust controls capable of providing vehicle occupants with simple and reliable functioning over the vehicle lifespan. In this regard, automotive designers spend considerable effort to improve existing controls to improve their robustness and reliability.

One area of such development has come from the use of field-effect sensors. Field-effect sensors allow controls to be isolated from direct contact with the operator and therefore can be placed behind protective surfaces within the automotive interior. This provides a simple and effective alternative to complex waterproofed button assemblies that add cost through both design and manufacturing. The field-effect sensors detect an operators touch through a sealed protective surface without requiring mechanical movement of that surface. Although field-effect sensors provide obvious benefits for use as automotive controls, they provide unique design challenges to designers.

One challenge to design and manufacturing stems from the nature of field-effect sensors. It is known that these sensors must be secured in close proximity behind a face plate or similar surface such that they will properly function when the surface is touched. Complex or curved surfaces provide considerable challenge to designers as the sensor assembly must follow closely the contours to provide reliable functioning. The present manufacturing technique has been to use adhesive between the field-effect sensors and the face plate to insure both proximity as well as contour correlation. This provides a significant manufacturing concern. No manufacturing process is flawless. Improper installation, orientation, or part manufacture may require disassembling of the sensor assembly. In cases wherein adhesive was utilized to affix the sensors, it is common for the sensors or the circuit assembly to which they are attached to experience delamination or similar damage. The cost of such electronics makes such damage highly undesirable. Additionally, remaining dried adhesive on the attachment surface may interfere with installation of a replacement sensor assembly. Therefore, present assembly techniques using adhesive generate costly manufacturing concerns as well as impediments to long-term maintenance.

It would, therefore, be highly desirable to have an automotive center stack instrument control assembly utilizing field-effect sensor technology without requiring the use of adhesives to attach the sensors to their corresponding mounting surfaces. Additionally, it would be highly desirable to have such an assembly wherein the sensors were adaptable to complex surface contours.

SUMMARY OF THE INVENTION

It is, therefore, an object of the present invention to provide an automotive center stack panel with contact-less switching. It is a further object of the present invention to provide such an automotive center stack panel with field-effect sensor technology that does not require the use of adhesives to properly locate and secure the sensors.

An automotive center stack panel assembly is provided comprising an instrument panel face plate having an outer face plate surface and an internal face plate surface. A display window region is formed into the instrument panel face plate and has a curved internal window surface. A flat flex circuit assembly is in direct contact with the curved internal window surface. The flat flex circuit assembly includes a plurality of field effect sensors. A clamp plate backer is mounted to the internal face plate surface. A soft durometer backer is positioned between the clamp plate backer and the flat flex circuit assembly, the clamp plate backer compresses the soft durometer backer such that the soft durometer backer presses the field effect sensors into direct contact with the curved internal window surface without adhesives.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
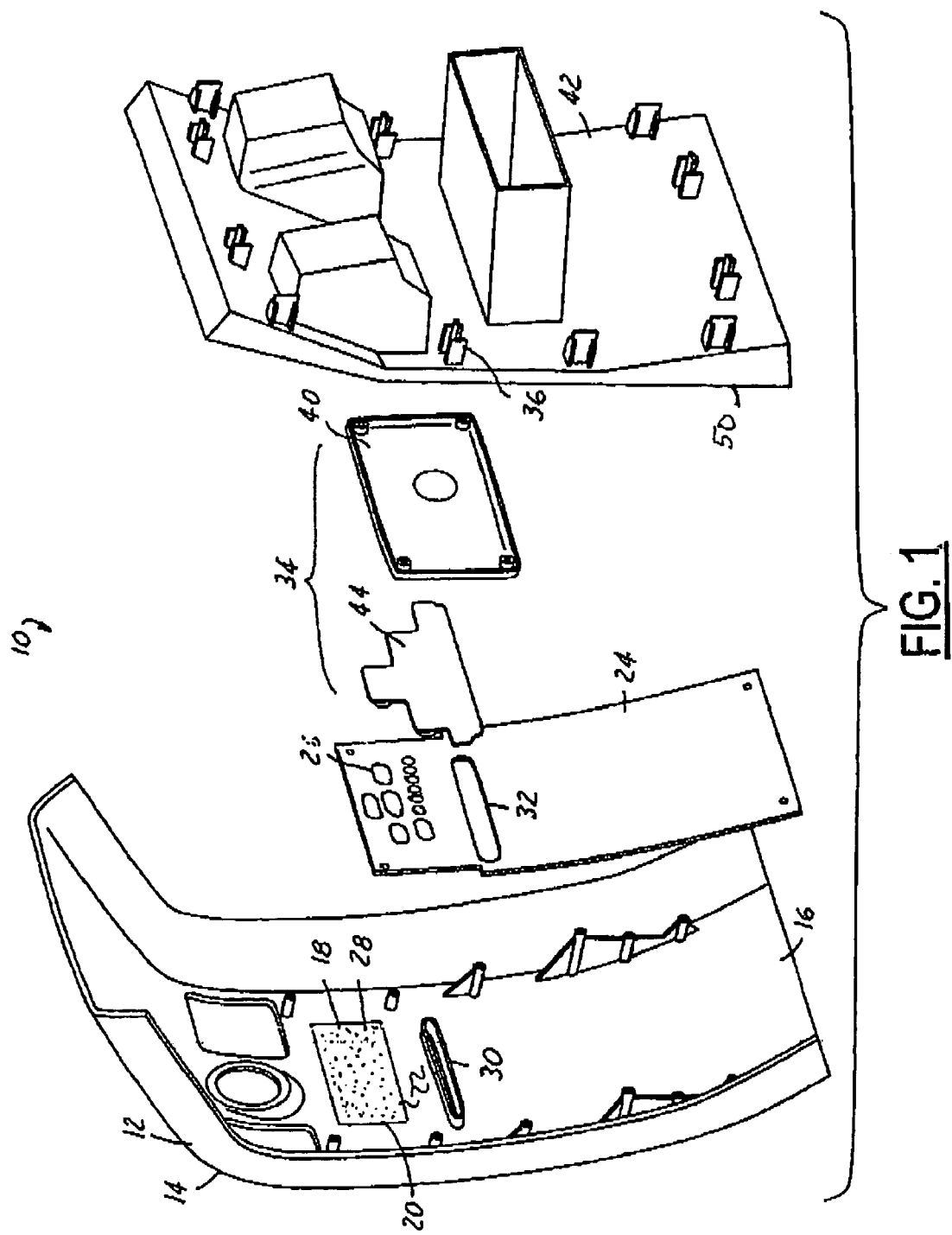
FIG. 1 is an illustration of an automotive center stack panel assembly in accordance with the present invention.

Referring now to FIG. 1, which is an illustration of an automotive center stack panel assembly 10 in accordance with the present invention. The automotive center stack panel assembly 10 illustrated is intended to encompass a wide variety of instrument panel assemblies suitable for automotive applications. As such, the automotive center stack panel assembly 10 includes an instrument panel face plate 12 having an outer face plate surface 14 and an internal face plate surface 16. The outer face plate surface 14 is intended to be exposed within an automotive interior while the internal face place surface 16 is hidden within an automotive dash. The instrument panel face plate 12 further includes a display window region 18. This region may be a separately injected surface or may simply be a dedicated region of the instrument panel face plate 12. An applicque 20 may be applied to the display window region 18 to provide images of operator control 22 to vehicle occupants.

The present invention further includes a flat flex circuit assembly 24 placed into communication with the internal face plate surface 16. The flat flex circuit assembly 24 includes a plurality of contact-less sensors 26. In one embodiment, these contact-less sensors 26 are intended to encompass field-effect sensors. In other embodiments, however, they may be capacitance sensors. The principle nature of the contact-less sensors 26 are that they allow activation by a vehicle occupant through the solid display window region 18 without mechanical contact.

As illustrated, the instrument panel face plate 12 often has complex surfaces such as the illustrated curved profile. As such, the internal window surface 28 is also commonly curved. It can be difficult, therefore, to properly located and secure the flat flex circuit assembly 24 into proper positioning such that the contact-less sensors 26 are properly positioned within the display window region 18 and in immediate contact with the curved internal window surface 28. The present invention provides a plurality of unique design features to simplify this. On such features comprises the inclusion of a structural protrusion 30 formed on the internal face plate surface 16. A guide slot 32 is formed through the flat flex circuit assembly 24 and is given a profile matching the structural protrusion 30 such that placement of the flat flex circuit assembly 24 over the structural protrusion 30 automatically locates the contact-less sensors 26 in their proper positions. It is desirable, however, for the contact-less sensors 26 to be placed in direct proximity to the curved internal window surface 28 without the use of adhesives, hereafter referred to as in direct contact.

The present invention accomplishes this through the use of a unique clamping assembly 34. The clamping assembly 34 is comprised of a clamp element 36 and soft durometer backer 38. The soft durometer backer 38 may be formed of any compressible soft durometer material such as silicone, butyl rubber, or closed cell foam. The clamp element 36 is attached to the internal face plate surface 16 and the soft durometer backer 38 is positioned between the clamp element 36 and the flat flex circuit assembly 24 such that the contact less sensors 26 are pressed firmly onto the curved internal window surface 28 without the need for adhesive. The clamp element 36 may be comprised of a separate clamp plate backer 40 to be used in combination with a main back grid support 42. In an alternate embodiment, the main back grid support 42 may be used alone as the clamp element 36. The soft durometer backer 38 may be attached to the clamp element 36 in a variety of fashions. These include, but are not limited to, the use of an adhesive layer 44, two shot mold mechanical attachment, or molecular bonding.

Figure 2:
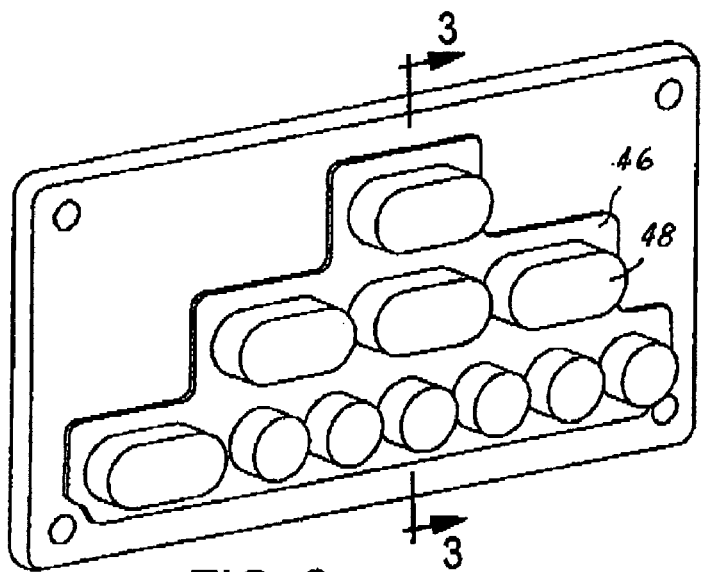
FIG. 2 a detail of a clamp assembly for use in the automotive center stack panel assembly illustrated in FIG. 1.
Figure 3:
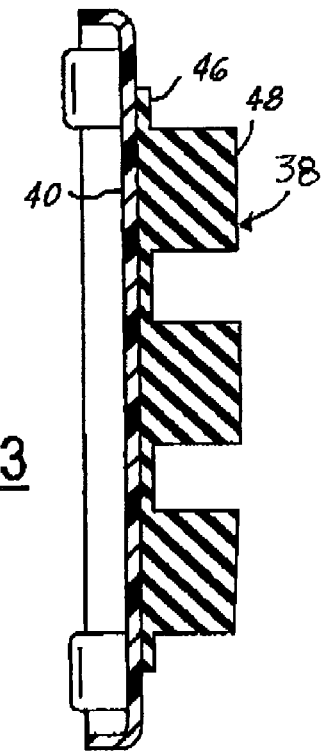
FIG. 3 is a cross-sectional illustration of the clamp assembly illustrated in FIG. 2.

Although the clamping assembly 34 may take on a variety of shapes and forms, one embodiment is illustrated in FIGS. 2 and 3. In this case the clamp plate backer 40 comprises a simple plate structure. The soft durometer backer 38, however, is comprised of a soft durometer panel 46 having a plurality of soft durometer protrusions 48 extending upwards from the panel 46. The soft durometer protrusions 48 are preferably designed in shape and size such that each of the soft durometer protrusions 48 matches one of the plurality of contact-less sensors 26. This helps ensure that the sensors 26 are maintained in proper position. Additionally, each of the soft durometer protrusions 48 includes a backer engagement surface 50 that makes actual contact with the flat flex circuit assembly 24. By molding or other forming the backer engagement surface 50 to match the curvature or other contour of the curved internal window surface 28, a uniform clamping pressure may be maintained on all of the contact-less sensors 26 helping to ensure uniformity of operation.

Figure 4:
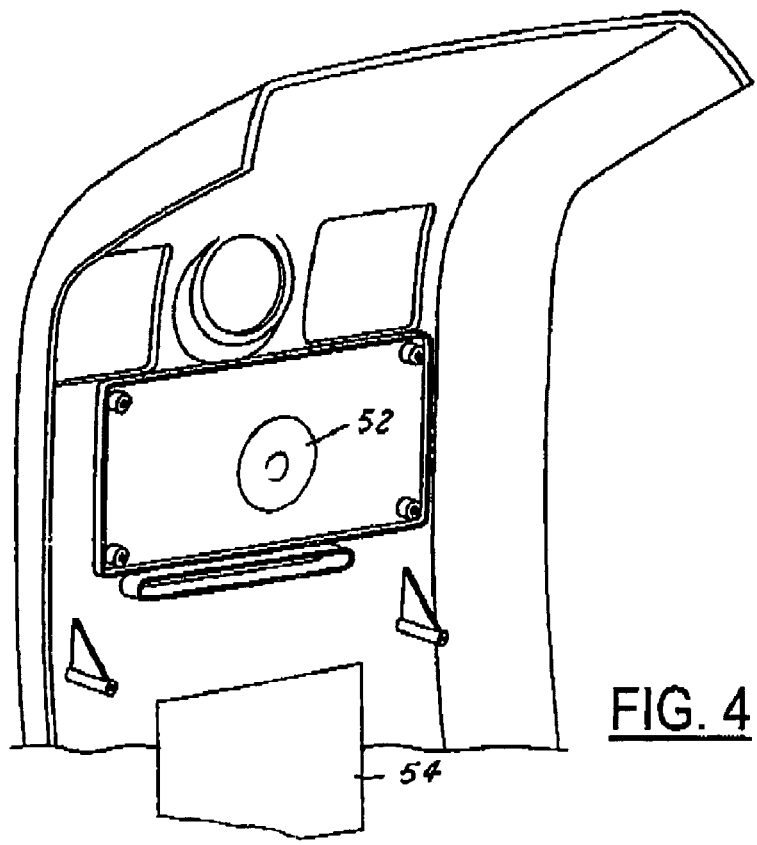
FIG. 4 is an assembled illustration of the automotive center stack panel assembly illustrated in FIG. 1.

An additional features of the present invention arrives from the nature of the clamping assembly 34. The clamping assembly 34 provides a mounting surface that is relatively isolated from the instrument panel face plate 12. As such, the clamping plate backer 40 provides an opportunistic surface for mounting components that benefit from such isolation. One such element, illustrated in FIG. 4, is contemplated to be an audio transducer 52. The audio transducer 52 may be utilized to provide an audio signal upon activation of one of the contact-less sensors 26. The audio signal will travel through the clamp plate backer 40 to the operator controls 22 such that a tactile feel is provided to the operator. In alternate embodiments, additional features such as a video monitor 54 may be mounted to the clamp plate backer 40 to reduce vibrations induced in the instrument panel face plate 12 from traveling through to the video monitor 54.

While particular embodiments of the invention have been shown and described, numerous variations and alternative embodiments will occur to those skilled in the art. Accordingly, it is intended that the invention be limited only in terms of the appended claims.

What is claimed is:

1. An automotive center stack panel assembly comprising:
    an instrument panel face plate having an outer face plate surface and an internal face plate surface;
    a display window region formed into said instrument panel face plate, said display window region having a curved internal window surface;
    a flat flex circuit assembly in direct contact with said curved internal window surface, said flat flex circuit assembly including a plurality of field effect sensors;
    a clamp plate backer mounted to said internal face plate surface;
    a soft durometer backer positioned between said damp plate backer and said flat flex circuit assembly, said clamp plate backer compressing said soft durometer backer such that said soft durometer backer presses said field effect sensors into direct contact with said curved internal window surface without adhesives.

2. An automotive center stack panel assembly as described in claim 1, wherein said soft durometer backer is mounted to said damp plate backer through an adhesive layer.

3. An automotive center stack panel assembly as described in claim 1, wherein said soft durometer backer is molecularly bonded to said clamp plate backer.

4. An automotive center stack panel assembly as described in claim 1, further comprising:
    at least one structural protrusion formed on said internal face plate surface; and
    a guide slot formed through said flat flex circuit assembly, said guide slot having a guide slot profile configured to match said at least one structural protrusion such that said flat flex circuit assembly is precisely located against said curved internal window surface.

5. An automotive center stack panel assembly as described in claim 1, further comprising:
    a main back grid support mounted to said internal face plate surface, said clamp plate backer positioned between said internal face plate surface and said main back grid support.

6. An automotive center stack panel assembly as described in claim 1, wherein said soft durometer backer comprises:
    a soft durometer panel; and
    a plurality of soft durometer protrusions extending upward from said soft durometer panel, each of said plurality of soft durometer protrusions corresponding to one of said plurality of field effect sensors.

7. An automotive center stack panel assembly as described in claim 6, wherein each of said soft durometer protrusions is shaped to match the corresponding one of said plurality of field effect sensors.

8. An automotive center stack panel assembly as described in claim 1, wherein soft durometer backer comprises a backer engagement surface in contact with said flat flex circuit assembly, said backer engagement surface molded to match said curved internal window surface.

9. An automotive center stack panel assembly as described in claim 1, further comprising:
an audio transducer mounted to said clamp plate backer, said audio transducer providing tactile feedback from activation of one of said field effect sensors.

10. An automotive center stack panel assembly as described in claim 1, further comprising;
an appliqué element applied to said display window, said appliqué providing operator controls corresponding to said field effect sensors.

11. An automotive center stack panel assembly comprising:
an instrument panel face plate having an outer face plate surface and an internal face plate surface;
a display window region formed into said instrument panel face plate, said display window region having a internal window surface;
a flat flex circuit assembly in direct contact with said internal window surface, said flat flex circuit assembly including a plurality of contacts sensors;
a clamp element mounted to said internal face plate surface;
a soft durometer backer positioned between said clamp element and said flat flex circuit assembly, said clamp element compressing said soft durometer backer such that said soft durometer backer presses said contact-less sensors into direct contact with said internal window surface without adhesives.

12. An automotive center stack panel assembly as described in claim 11, wherein said clamp element comprises a clamp plate backer.

13. An automotive center stack panel assembly as described in claim 11, wherein said clamp element comprises a main back grid support.

14. An automotive center stack panel assembly as described in claim 11, wherein said contact-less sensors comprise field-effect sensors.

15. An automotive center stack panel assembly as described in claim 11, wherein said contact-less sensors comprise capacitance sensors.

16. An automotive center stack panel assembly as described in claim 11, further comprising:
at least one structural protrusion formed on said internal face plate surface; and
a guide slot formed through said flat flex circuit assembly, said guide slot having a guide slot profile configured to match said at least one structural protrusion such that said flat flex circuit assembly is precisely located against said internal window surface.

17. An automotive center stack panel assembly as described in claim 11, wherein said soft durometer backer comprises:
a soft durometer panel; and
a plurality of soft durometer protrusions extending upward from said soft durometer panel, each of said plurality of soft durometer protrusions corresponding to one of a plurality of field effect sensors.

18. An automotive center stack panel assembly as described in claim 11, wherein said soft durometer backer comprises a backer engagement surface in contact with said flat flex circuit assembly, said backer engagement surface molded to match said internal window surface.

* * * * *

UNITED STATES PATENT AND TRADEMARK OFFICE
CERTIFICATE OF CORRECTION

| | | |
|---|---|---|
| PATENT NO. | : 7,168,751 B2 | Page 1 of 1 |
| APPLICATION NO. | : 10/711466 | |
| DATED | : January 30, 2007 | |
| INVENTOR(S) | : Robert Mark Schmidt, Paul R. McEvilly and Anthony C. Walowich | |

It is certified that error appears in the above-identified patent and that said Letters Patent is hereby corrected as shown below:

In the Claims:

Claim 1:
Column 4, Line 28, should read as follows: --a soft durometer backer positioned between said clamp--

Column 4, Line 36, shoud read as follows: --mounted to said clamp plate backer through an adhesive--

Column 5, Line 25, should read as follows: --including a plurality of contact-less sensors;--

Signed and Sealed this

Twenty-fourth Day of July, 2007

JON W. DUDAS
*Director of the United States Patent and Trademark Office*